(12) United States Patent
Williams

(10) Patent No.: US 6,680,834 B2
(45) Date of Patent: Jan. 20, 2004

(54) APPARATUS AND METHOD FOR CONTROLLING LED ARRAYS

(75) Inventor: Marion S. Williams, Olathe, KS (US)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 09/834,277

(22) Filed: Apr. 12, 2001

(65) Prior Publication Data

US 2002/0149892 A1 Oct. 17, 2002

Related U.S. Application Data

(60) Provisional application No. 60/237,876, filed on Oct. 4, 2000.

(51) Int. Cl.[7] ................................................. H02H 9/00
(52) U.S. Cl. ............................................ 361/58; 361/89
(58) Field of Search ............................... 361/58; 363/89

(56) References Cited

U.S. PATENT DOCUMENTS

| 6,016,326 | A | 1/2000 | Claisse et al. ................. 372/44 |
| 6,049,703 | A | 4/2000 | Staudinger et al. ......... 455/114 |
| 6,061,218 | A | 5/2000 | Ida et al. ....................... 361/56 |
| 6,087,969 | A | 7/2000 | Stockstad et al. ........... 341/143 |
| 6,362,578 | B1 * | 3/2002 | Swanson et al. ............ 315/307 |

* cited by examiner

Primary Examiner—Stephen W. Jackson
Assistant Examiner—James A Demakis

(57) ABSTRACT

A high precision, high efficiency controller for LED devices such as LED arrays includes a current limiter, driver and buffer.

12 Claims, 3 Drawing Sheets

APPARATUS AND METHOD FOR CONTROLLING LED ARRAYS

CROSS-REFERENCES TO RELATED APPLICATIONS

This application claims priority from copending U.S. patent application Ser. No. 60/237,876, titled: "High Precision, High Efficiency Dimming Controller For LED Arrays," filed Oct. 4, 2000 and incorporated herein by reference.

BACKGROUND OF THE INVENTION

The present invention relates to controllers for LED devices and more particularly to dimming controllers for displays backlit by LED displays.

A light emitting diode, or LED, comprises a diode that emits visible light when current passes through it. LEDs have several applications. Certain display devices, for example, but not limited to, aircraft cockpit displays, use an array of LEDs to backlight and illuminate a liquid crystal display (LCD). Controlling the amount of light emitted by the LED array is desirable to adjust the brightness of the display. The brightness level impacts the ease with which the display may be viewed under certain lighting conditions, such as bright sunlight; as well as individual viewer comfort level with the display.

In some applications, the brightness level is more than a convenience factor. For example, in the aviation environment, if the display is illuminated too brightly at night, the excessive brightness may adversely impact the pilot's night vision. Impaired night vision impacts the safety of flight.

The brightness level additionally affects the amount of power required to operate the device as well as the heat given off by the display. Power consumption affects the length of time the device can operate on battery power and the electrical load placed on the vehicle power supply systems. The heat given off by the display also affects what, if any, cooling of the display and surrounding equipment is required. Cooling devices add cost and complexity to equipment and systems. In aircraft/spacecraft applications, cooling systems add unwanted additional weight to the vehicle. Furthermore, if the display generates too much heat, touching or otherwise operating the display may cause discomfort, and in extreme cases, present a fire hazard, to the user.

The amount of light emitted by the diode can be controlled by controlling the amount of power supplied to the diode where power equals voltage times current (P=V*I). In certain prior art devices, a microprocessor device is coupled to drive circuitry that controls the LED display brightness. In such designs, a technique known as pulse width modulation (PWM) is used to control the power supplied to the device. Under control of the microprocessor, the drive circuitry supplies current to the LED for a predetermined amount of time, or one pulse width. In this manner, by varying the number of pulses received and the width of the pulses, the total power supplied to the LED, and hence the brightness can be controlled.

Thus, in theory, the lowest luminance level which can be achieved by the display is limited only by the resolution with which the pulse frequency and width can be conveyed from the modulator to the LED circuit. In practice, however, these low brightness levels can be difficult to achieve. The LED devices which comprise the display experience performance changes as a function of temperature. In addition, the LED devices may not have uniform electrical properties. These nonuniformities result in different power levels required to operate individual ones of the LED devices. Precise control of the array brightness in prior art designs is therefore difficult especially at low brightness levels. Furthermore, the human eye is especially adept at perceiving light emitted from the diode even at low power levels. This fact further exacerbates the nonlinearities in luminescence present in prior art devices. Thus, it is not presently possible to control the brightness of the LED display with the precision desired.

BRIEF SUMMARY OF THE INVENTION

The present invention recognizes the problems of the prior art and provides a solution thereto. In particular, the present invention provides a method and apparatus for illuminating a display using an array of LEDs that provides for improved safety, efficiency and performance over prior art designs. The present invention enables precise control of the brightness level of the LED display even at low luminance levels.

According to one aspect of the present invention, the present invention includes a current limiter that bounds the amount of current that may be supplied to the entire array. Fire hazards and poor operation due to current runaway conditions are thereby prevented. In addition the current limiter of the present invention minimizes the size power supply required to operate the array and the cost of associated components. Operation of the LED array is also made more robust since power supply fluctuations and manufacturing tolerance variations in circuit components do not impact operation of the display.

According to another aspect of the present invention, the invention includes a controller, or control circuit, that controls display brightness. In a preferred embodiment of the invention, the control circuit includes a control signal buffer and an array driver that operate to control LED current in a manner linearly proportional to the level commanded by the control pulse. When pulse width modulation is used to control display brightness, the control circuit of the present invention operates to respond by switching the current drawn through the LED array within the time frame of the shortest duration pulse. Precise control of display brightness is achieved at even the lowest of commanded brightness levels.

Further features and advantages of the present invention will be described in detail below with reference to the drawings.

DETAILED DESCRIPTION OF THE PREFERRED EMBODIMENTS

Figure 1:
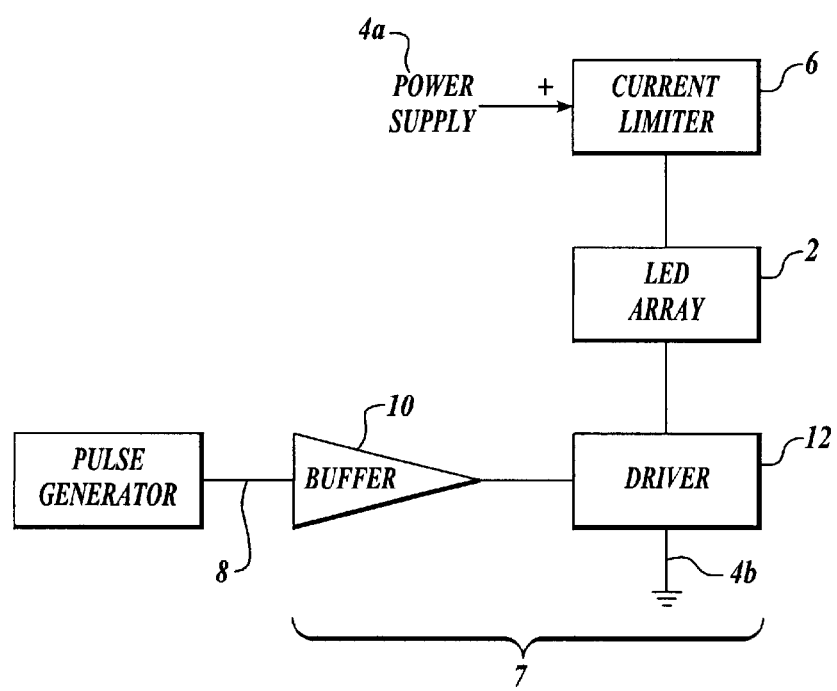
FIG. 1 is a block diagram of a controller according to a preferred embodiment of the present invention.

FIG. 1 is a top level diagram of a controller useful for controlling an LED array and in particular useful as a dimming controller for a LED backlit display. In the block diagram of FIG. 1, an LED array 2 receives power from a power supply having positive and negative terminals 4a and 4b respectively. Although the diagram of FIG. 1 shows the negative pole 4b of the power supply to be at ground, other values may be used so long as a potential difference exists between the two poles. The block diagram of FIG. 1 additionally includes a current limiter 6 disposed between LED array 2 and the positive pole 4a of the power supply. As will be explained in greater detail below, current limiter 6 serves to prevent the current draw of LED array 2 from exceeding a predetermined threshold value.

A control circuit 7 regulates the brightness level of array 2. Control circuit 7 receives a control signal 8 in which is encoded the desired brightness level. Control signal 8 may comprise a pulse width modulated signal useful for regulating display brightness by regulating the average voltage supplied to the LED array in a given time interval. A Motorola 68HC16Z1 processor is an example of circuits known to those of skill in the art useful for generating control signal 8. In one preferred embodiment of the invention, the pulse width modulation resolution may be additionally enhanced in the manner taught by copending application Ser. No. 60/196,770 incorporated herein by reference. Other control signals known to those of skill in the art may also be used.

Control signal 8 is passed through a buffer 10. In a preferred embodiment of the invention, buffer 10 comprises a standard push/pull buffer known to those of skill in the art. Buffer 10 is designed to have a response time faster than the shortest duration pulse contained in control signal 8.

The buffered control signal output by buffer 10 is input to a driver 12. Driver 12 comprises a "low side" driver that regulates the power level, and hence brightness, of array 2 by switching on and off in response to control signal 8. When the switching circuit of driver 12 is closed, a potential difference exists between terminals 4a and 4b and current flows through array 2. According to a preferred embodiment of the invention, the switching mechanism of driver 12 comprises a field effect transistor (FET).

Figure 2:
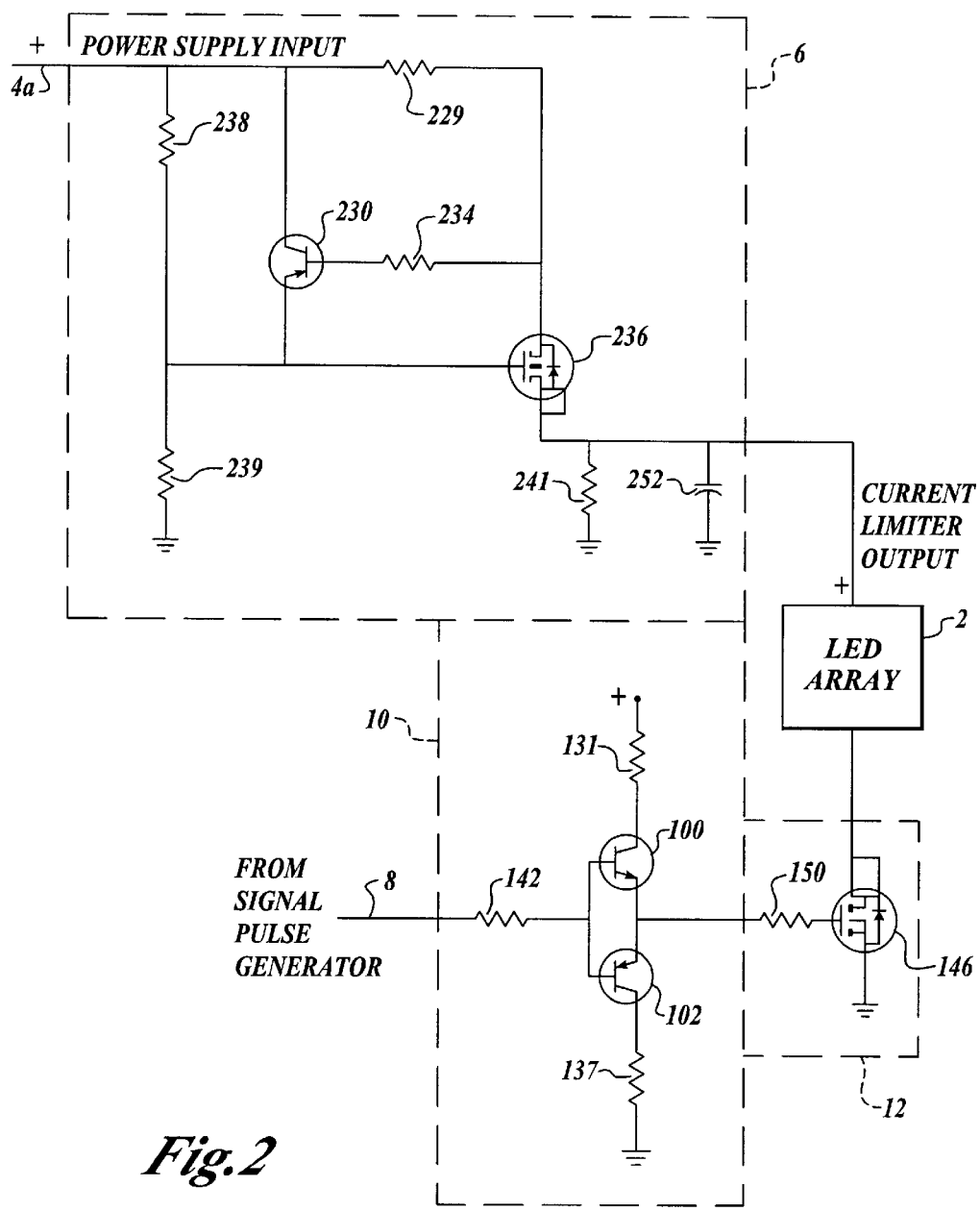
FIG. 2 is a circuit diagram of a controller according to a preferred embodiment of the present invention.

FIG. 2 contains a circuit diagram useful for explaining the construction and operation of the block elements of FIG. 1 in greater detail. The invention is not limited to the specific component specifications and part numbers provided in the drawing, and the parts may be sized in accordance with the load and performance requirements of the array. FIG. 2 is a representative embodiment of the present invention. As will be readily apparent to those of skill in the art, equivalent circuits may be designed to perform in the manner taught by the present invention.

As shown in the embodiment of FIG. 2, buffer 10 comprises two transistors 100 and 102 arranged in push/pull configuration and coupled to resistances 131 and 137 respectively. Control signal 8 is supplied through resistor 142 and to transistors 100 and 102. Buffer 10 operates to increase the magnitude of the current supplied by control signal 8 to rapidly drive the gate of switching transistor 146 of driver 12. The drive signal received through resistor 150 at the gate of transistor 146 causes transistor 146 to turn on or off in correspondence with control pulse 8. Preferably buffer 10 is designed to supply sufficient current to transistor 146 such that transistor 146 can turn on and off within the time frame of the narrowest control pulse 8. If transistor 146 did not turn on or of with a response time corresponding the shortest duration pulse, nonlinearities would be introduced into the brightness control of array 2.

When a positive control pulse is provided on line 8, transistor 146 switches to a state in which current is drawn through array 2. The brightness level of array 2 is governed by the average power supplied to array 2. Increasing the number or duration of the control pulse signals increases the amount of time transistor 146 operates to draw power through array 2 and increases the brightness of the display.

Current limiter 6 operates to prevent an overheating problem from developing due to excessive current being drawn by the LEDs comprising the array. A known characteristic of LED devices is that the LEDs become warm during use. As the LED heats up, the LED forward voltage drops and the LED attempts to draw more current. This characteristic can result in a condition known as "current runaway." in which the LED heats up further, further reducing its forward voltage drop and the array thus attempts to draw an ever increasing amount of current. Such a condition strains the power supply and the operating integrity of other loads on the circuit. In extreme circumstances, the current runaway condition can result in the array catching fire.

The current runaway problem may also be caused by manufacturing irregularities and normal statistical variations in the characteristics of the individual LED devices. Specifically, one LED or one particular manufacturing lot of LEDs may have a slightly different forward voltage drop than another. When arranged in an array, those LEDs having a lower forward voltage drop than the other LEDs in the array will attempt to draw more current. These LEDs will heat up at a faster rate than the remaining devices, placing a still greater and disproportionate demand for current on the power supply system. Without design safeguards, a current runaway condition will again result.

In the embodiment of FIG. 2, current limiter 6 is coupled to the positive side of power supply line 4a. When driver 12 activates array 2, a current draw occurs and current flows through limiter 6. A voltage drop occurs on resistor 229. This voltage drop functions as a current sense element. The voltage difference is supplied to the base of a transistor 230 through resistor 234 and provides transistor 230 with just enough current to turn transistor 230 slightly on. The current through resistor 229 is also supplied to transistor 236. Transistor 236 is designed to be on whenever a predetermined threshold gate voltage is present due to current flow through resistors 238 and 239, relative to the source voltage of transistor 236. As current draw from array 2 increases, the voltage drop across resistor 229 also increases. The increased voltage drop causes transistor 230 to turn on more fully. Transistor 230 will continue to turn on in proportion to the increased current draw. When transistor 230 becomes more fully turned on, the voltage difference on the collector and emitter of transistor 230 becomes less. As a result, the gate to source voltage on transistor 236 becomes less causing transistor 236 to begin to shut off. This action limits the current flowing to array 2. Circuit 6 therefor acts as a closed loop system to limit the current supplied to array 2 and prevent current runaway. Current limiter 6 is preferably designed to limit current with a response time corresponding to the shortest duration pulse of control signal 8. Such a design ensures linearity of light output in proportion to the duration of the brightness control signal. Resistor 241 is useful for testing of circuit 6. Capacitor 252 is useful for limiting electromagnetic interference caused by operation of the display circuit. Limiting electromagnetic interference can be desirable in certain applications such as aboard aircraft.

Figure 3:
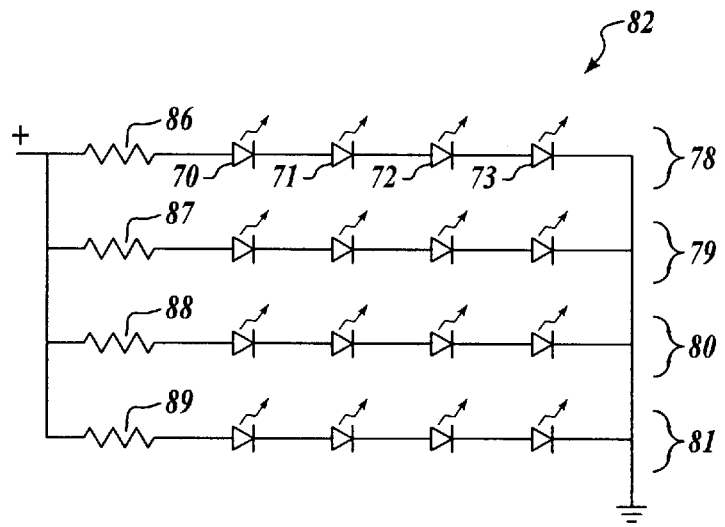
FIG. 3 is a circuit diagram of an LED array as exists in the prior art.

Prior art devices solved the current runaway problem in a manner significantly different from and without the advantages of the present invention. FIG. 3 shows the prior art design. The prior art design connects the individual LEDs 70–73 serially in a row to form a string 78 of LEDs. Numerous strings 78–81 are then connected in parallel to form an LED array 82. A resistor 86–90 is placed in series with each string 78–81 of array 82. The resistor serves to prevent the current drawn on one string from getting out of balance with the current drawn on the remaining strings. In operation, however, resistors 78–81, produce heat and dissipate power. This fact adds complexity to the cooling needs of the device, increases the size of the power supply necessary to support operation of the device, and elevates the operating temperature of the LEDs thereby further exacerbating the conditions leading to current runaway.

Figure 4:
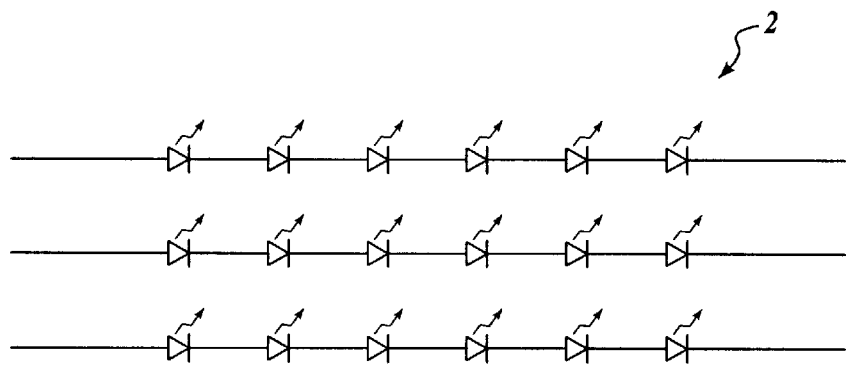
FIG. 4 is a circuit diagram of an LED array according to a preferred embodiment of the present invention.

The current limiter of the present invention places an overall current limit on LED array 2. This feature of the present invention permits the LED array to be constructed in the manner shown in FIG. 4. By limiting the overall current provided to array 2, there no longer exists a need for resistors to be coupled in series with each LED string. The power dissipation and heat generation disadvantages of the prior art design are thus avoided by the present invention. The power supply may therefore be sized within a few volts of the nominal power load expected from the array. For example, in an application designed using a preferred embodiment of the invention, the array nominally requires a 21.5 volt power supply. A 23 volt power supply was found to be adequate for use with the design. The cost of the power supply used with the array is thereby reduced as well as the cost of associated circuitry.

Furthermore, by limiting the power supply to under 28 volts, commercially available circuit hardware can be used in the design. In contrast, designs using the prior art configuration of FIG. 3 may require a power supply in excess of 135 volts for an equivalent array. The voltage required also influences the trace spacing required on the circuit layout board. Higher voltages mandate increased spacing between the conductive traces printed on the board thereby increasing the size and cost of the circuit board. The reduced power supply voltage requirement of the present invention also reduces the risk of injury while maintaining or servicing the array.

The current limit device of the present invention, has yet additional advantages. Specifically, the present invention minimizes the effects of unwanted power supply voltage fluctuations and non-uniformity of supply voltage level among individually manufactured units. Similar to the LED variances described above, power supplies manufactured in different lots or by different manufacturers may have slightly different output tolerances. The different tolerances may cause the supply voltage to vary between parts. Supply voltage may also vary due to other loads placed on the power supply. These other circuits connected to the power supply may cause the supply output to vary. The current limiting device of the present invention minimizes the effects of such fluctuations by maintaining an upper limit on the current supplied to the array as a whole.

Preferred embodiments of the invention have now been described. Variations and modifications will be readily apparent to those of ordinary skill in the art. For example, the invention is useful for backlighting a control knob or control panel button using a single LED device. For this reason, the invention should be interpreted in light of the claims.

What is claimed is:

1. An apparatus for controlling the brightness of an LED array comprising:
  a current limiter disposed between the LED array and a power supply, for limiting an amount of current supplied to the entire LED array; and
  a controller having an input coupled to receive a plurality of control signals and having an output coupled to the LED array for controlling the brightness of the LED array in accordance with said plurality of control signals.

2. The apparatus of claim 1 wherein said controller further comprises:
  a drive circuit coupled to said output; and
  a buffer disposed between said drive circuit and said input for buffering said plurality of control signals.

3. A display illuminated using a plurality of LEDs, the display comprising:
  (a) an array of LED devices wherein said array consists of:
    (i) a plurality of individual LED devices connected in series to form a string;
    (ii) a plurality of said strings connected in parallel to form said array;
  (b) a current limiter disposed between a power supply and said array for limiting an amount of current supplied to said array; and
  (c) a controller having an input adapted to receive a plurality control signals and an output coupled to said array for controlling a brightness of said array in accordance with said control signals.

4. A display illuminated using a plurality of LEDs, the display comprising:
  (a) an array of LED devices wherein said array consists of:
    (i) a plurality of individual LED devices connected in series to form a string;
    (ii) a plurality of said strings connected in parallel to form said array;
  (b) a current limiter disposed between a power supply and said array for limiting an amount of current supplied to said array; and
  (c) a controller having an input adapted to receive a plurality of control signals and an output coupled to said array for controlling a brightness of said array in accordance with said control signals, wherein said controller comprises:
    (i) a drive circuit coupled to said output; and
    (ii) a buffer disposed between said drive circuit and said input for buffering said plurality of signals.

5. The display of claim 4 wherein said buffer comprises a push/pull buffer.

6. A circuit for controlling the brightness of an LED array, the circuit comprising:
  (a) a current limiter having:
    (i) a current limiter input coupled to a first pole of a power supply;
    (ii) a PNP transistor; having a collector coupled to said input;
    (iii) a first resistor disposed between said input and an emitter of said PNP transistor;
    (iv) a second resistor disposed between said emitter of said PNP transistor and ground;
    (v) a first FET having a gate coupled to said emitter of said PNP transistor;
    (vi) a third resistor disposed between said input and a source of said first FET transistor;
    (vii) a fourth resistor disposed between a base of said PNP transistor and said source of said first FET; and
    (viii) a current limiter output coupled to a first pole of the LED array and to a drain of said first FET;
  (b) a driver having a driver input adapted to receive a plurality of signals useful for controlling a brightness of the LED array and having a driver output coupled to a second pole of the LED array, the driver further including:
  (i) a push/pull buffer having a buffer input coupled to said driver input and a buffer output;
  (ii) a second FET having a source coupled to ground, a drain coupled to said driver output and a gate; and
  (iii) a fifth resistor disposed between said buffer output and said gate of said second FET.

7. The circuit of claim 6 further comprising a capacitance device coupled to said output of said current limiter to reduce electromagnetic interference caused by the circuit.

8. The circuit of claim 6 wherein said buffer further comprises:
  an NPN transistor having an emitter coupled to said buffer output, a base and a collector;
  a second PNP transistor having a base coupled to said base of said NPN transistor, an emitter coupled to said emitter of said NPN transistor and to said buffer output, and a collector;
  a sixth resistor having a first terminal coupled to said buffer input and a second terminal coupled to said base of said NPN transistor and to said base of said second PNP transistor;
  a seventh resistor disposed between said collector of said second PNP transistor and ground; and
  an eighth resistor disposed between said collector of said NPN transistor and a voltage input.

9. A method for controlling an LED array comprising the steps of:
  receiving a control signal;
  boosting a current of said control signal using a buffer that operates with a response time at least as fast as the shortest duration pulse of said control signal to obtain a buffered control signal;
  supplying said buffered control signal to a driver to drive the LED array according to said buffered control signal; and
  limiting an amount of current supplied to the entire array while maintaining continued operation of the LED array.

10. A method for controlling the brightness of an LED array comprising the steps of:
  supplying power to the LED array in accordance with a control signal; and
  preventing a magnitude of an amount of current supplied to the entire LED array from exceeding a predetermined threshold value while maintaining continued operation of the LED array.

11. The method for controlling the brightness of an LED array according to claim 10 wherein said control signal comprises a pulse width modulated signal.

12. A method for controlling the brightness of an LED device comprising the steps of:
  receiving a pulse width modulated control signal representative of a desired LED device brightness;
  supplying power to the LED device in accordance with said pulse width modulated control signal; and
  preventing a magnitude of current drawn by the LED device from exceeding a predetermined threshold value while maintaining continued operation of the LED device.

* * * * *